US012560625B2

(12) United States Patent
Kawakami

(10) Patent No.: US 12,560,625 B2
(45) Date of Patent: Feb. 24, 2026

(54) WIND ESTIMATION APPARATUS, WIND ESTIMATION METHOD, AND NON-TRANSITORY STORAGE MEDIUM

(71) Applicant: NEC Corporation, Tokyo (JP)

(72) Inventor: Kazuya Kawakami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 225 days.

(21) Appl. No.: 18/231,358

(22) Filed: Aug. 8, 2023

(65) Prior Publication Data

US 2024/0103033 A1 Mar. 28, 2024

(30) Foreign Application Priority Data

Sep. 22, 2022 (JP) ................................. 2022-150922

(51) Int. Cl.
| | |
|---|---|
| *G01P 5/00* | (2006.01) |
| *B64U 10/13* | (2023.01) |
| *B64U 101/30* | (2023.01) |
| *G01P 13/02* | (2006.01) |
| *G05D 1/00* | (2024.01) |

(52) U.S. Cl.
CPC .............. *G01P 5/001* (2013.01); *G01P 13/02* (2013.01); *G05D 1/1062* (2019.05); *B64U 10/13* (2023.01); *B64U 2101/30* (2023.01)

(58) Field of Classification Search
CPC ....... G01P 5/001; G01P 13/02; G05D 1/1062; B64U 10/13; B64U 2101/30
See application file for complete search history.

(56) References Cited

FOREIGN PATENT DOCUMENTS

| | | | |
|---|---|---|---|
| JP | 2018-165130 A | 10/2018 | |
| JP | 7054507 B2 * | 4/2022 | |
| WO | WO-2022158387 A1 * | 7/2022 | ................ G01P 3/36 |

* cited by examiner

*Primary Examiner* — Hitesh Patel
*Assistant Examiner* — Joshua Jeffrey Penko
(74) *Attorney, Agent, or Firm* — Sughrue Mion, PLLC.

(57) ABSTRACT

A wind estimation apparatus includes an acquisition unit and an estimation unit. The acquisition unit acquires a target image of a target region. The estimation unit estimates at least one of a direction and strength of wind in the target region by using the target image.

16 Claims, 12 Drawing Sheets

| RANGE OF DIRECTION OF MOVEMENT | RANGE OF MOVEMENT SPEED | FIRST REFERENCE TRAJECTORY |
|---|---|---|
| EQUAL TO OR MORE THAN 0 deg AND EQUAL TO OR LESS THAN 15 deg | EQUAL TO OR LESS THAN 20 km/h | TRAJECTORY 1 |
| | EXCEEDING 20 km/h AND EQUAL TO OR LESS THAN 40 km/h | TRAJECTORY 2 |
| | EXCEEDING 40 km/h AND EQUAL TO OR LESS THAN 60 km/h | TRAJECTORY 3 |
| | EXCEEDING 60 km/h | TRAJECTORY 4 |
| EXCEEDING 15 deg AND EQUAL TO OR LESS THAN 30 deg | EQUAL TO OR LESS THAN 20 km/h | TRAJECTORY 5 |
| | EXCEEDING 20 km/h AND EQUAL TO OR LESS THAN 40 km/h | TRAJECTORY 6 |
| | EXCEEDING 40 km/h AND EQUAL TO OR LESS THAN 60 km/h | TRAJECTORY 7 |
| | EXCEEDING 60 km/h | TRAJECTORY 8 |
| ⋮ | ⋮ | ⋮ |

FIG. 8

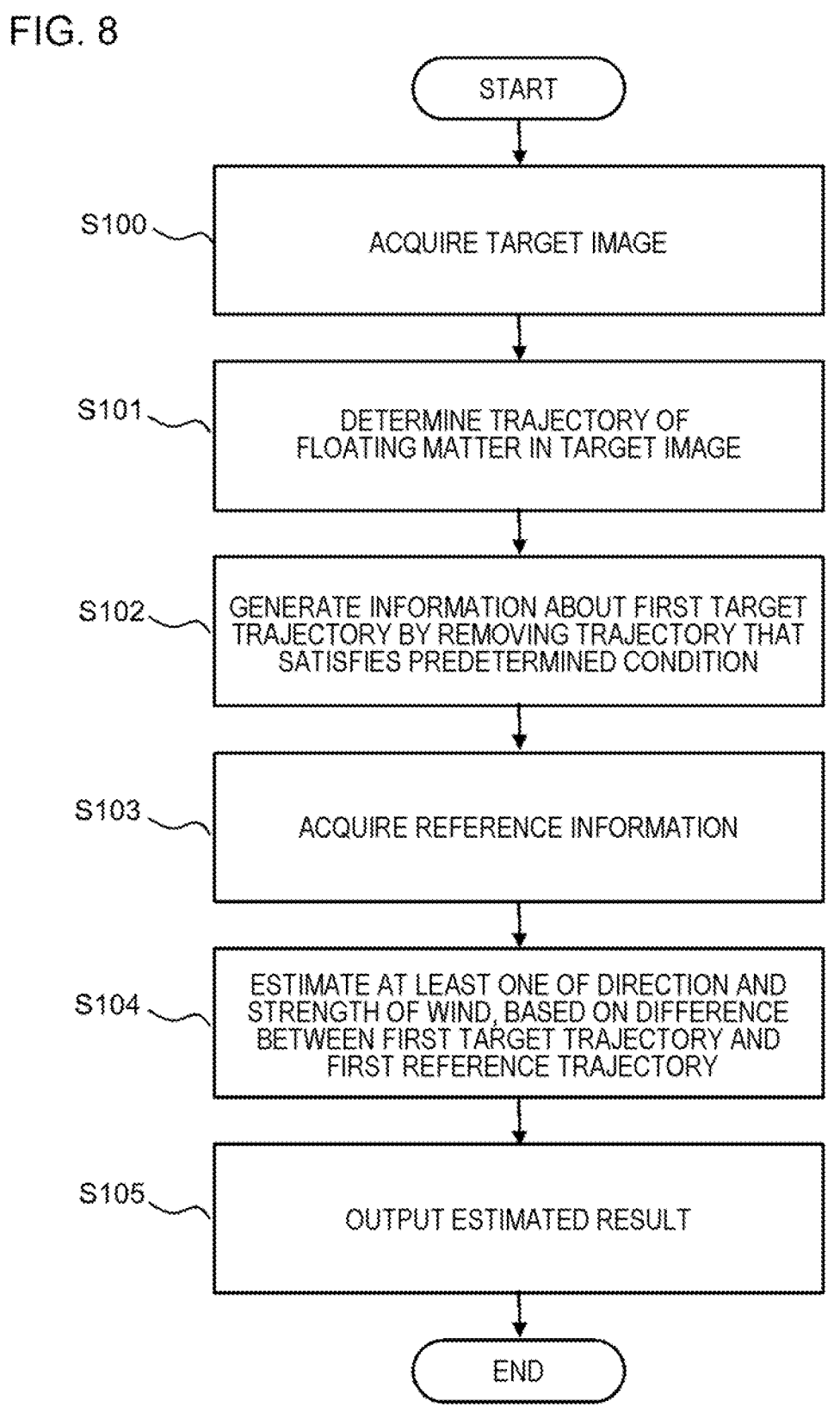

```
                    ┌───────────┐
                    │   START   │
                    └───────────┘
                          │
                          ▼
   ┌─────────────────────────────────────────────┐
S100│         ACQUIRE TARGET IMAGE                 │
   └─────────────────────────────────────────────┘
                          │
                          ▼
   ┌─────────────────────────────────────────────┐
S101│         DETERMINE TRAJECTORY OF              │
   │      FLOATING MATTER IN TARGET IMAGE          │
   └─────────────────────────────────────────────┘
                          │
                          ▼
   ┌─────────────────────────────────────────────┐
S102│   GENERATE INFORMATION ABOUT FIRST TARGET    │
   │  TRAJECTORY BY REMOVING TRAJECTORY THAT       │
   │   SATISFIES PREDETERMINED CONDITION           │
   └─────────────────────────────────────────────┘
                          │
                          ▼
   ┌─────────────────────────────────────────────┐
S103│        ACQUIRE REFERENCE INFORMATION         │
   └─────────────────────────────────────────────┘
                          │
                          ▼
   ┌─────────────────────────────────────────────┐
S104│  ESTIMATE AT LEAST ONE OF DIRECTION AND      │
   │  STRENGTH OF WIND, BASED ON DIFFERENCE        │
   │  BETWEEN FIRST TARGET TRAJECTORY AND          │
   │       FIRST REFERENCE TRAJECTORY              │
   └─────────────────────────────────────────────┘
                          │
                          ▼
   ┌─────────────────────────────────────────────┐
S105│          OUTPUT ESTIMATED RESULT             │
   └─────────────────────────────────────────────┘
                          │
                          ▼
                    ┌───────────┐
                    │    END    │
                    └───────────┘
```

WIND ESTIMATION APPARATUS, WIND ESTIMATION METHOD, AND NON-TRANSITORY STORAGE MEDIUM

This application is based upon and claims the benefit of priority from Japanese patent application No. 2022-150922, filed on Sep. 22, 2022, the disclosure of which is incorporated herein in its entirety by reference.

BACKGROUND

Technical Field

The present invention relates to a wind estimation apparatus, a wind estimation system, a wind estimation method, and a program.

Background Art

In recent years, a flying object such as a drone has been developed for use of transporting, monitoring, searching, and the like. Herein, in order for the flying object to safely fly, a surrounding situation of wind needs to be recognized.

PTL 1 (Japanese Patent Application Publication No. 2018-165130) describes that information about a wind speed is acquired by a measurement unit provided to a cable extending from a flight machine.

SUMMARY

However, in the technique in PTL 1 described above, the measurement unit needs to be provided separately from the flight machine.

One example of an object of the present invention is, in view of the problem described above, to provide a wind estimation apparatus, a wind estimation system, a wind estimation method, and a program that enables to easily recognize a situation of wind.

One example aspect of the present invention provides a wind estimation apparatus including:

at least one memory configured to store instructions; and at least one processor configured to execute the instructions to perform operations comprising:

acquiring a target image of a target region; and estimating at least one of a direction and strength of wind in the target region by using the target image.

One example aspect of the present invention provides a wind estimation method including, by one or more computers:

acquiring a target image of a target region; and estimating at least one of a direction and strength of wind in the target region by using the target image.

One example aspect of the present invention provides a non-transitory storage medium storing a program causing a computer to execute a wind estimation method, the wind estimation method comprising:

acquiring a target image of a target region, and estimating at least one of a direction and strength of wind in the target region by using the target image.

One example aspect of the present invention can provide a wind estimation apparatus, a wind estimation system, a wind estimation method, and a program that enables to easily recognize a situation of wind.

BRIEF DESCRIPTION OF THE DRAWINGS

The above and other objects, advantages and features of the present invention will be more apparent from the following description of certain preferred example embodiments taken in conjunction with the accompanying drawings, in which:

FIG. 1 is a diagram illustrating an overview of a wind estimation apparatus according to a first example embodiment.

FIG. 5 is a diagram illustrating a configuration of reference information.

FIG. 8 is a flowchart illustrating a flow of the wind estimation method according to the first example embodiment.

EXAMPLE EMBODIMENT

The invention will be now described herein with reference to illustrative example embodiments. Those skilled in the art will recognize that many alternative example embodiments can be accomplished using the teachings of the present invention and that the invention is not limited to the example embodiments illustrated for explanatory purposes. Hereinafter, example embodiments of the present invention will be described with reference to the drawings. Note that, in all of the drawings, a similar component has a similar reference sign, and description thereof will be appropriately omitted.

First Example Embodiment

Figure 1:
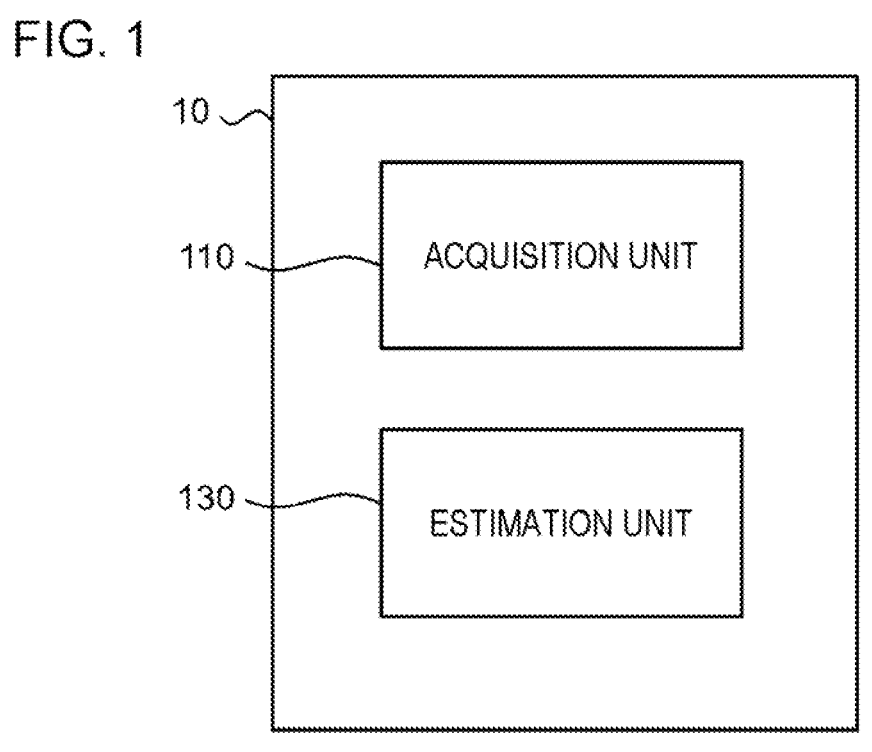

FIG. 1 is a diagram illustrating an overview of a wind estimation apparatus 10 according to a first example embodiment. The wind estimation apparatus 10 includes an acquisition unit 110 and an estimation unit 130. The acquisition unit 110 acquires a target image of a target region. The estimation unit 130 estimates at least one of a direction and strength of wind in the target region by using the target image.

The wind estimation apparatus 10 enables to easily recognize a situation of wind by using the target image.

Hereinafter, a detailed example of the wind estimation apparatus 10 will be described.

Figure 2:
FIG. 2 is a diagram illustrating capturing of a target image according to the first example embodiment.

FIG. 2 is a diagram illustrating capturing of a target image according to the present example embodiment. In an example in FIG. 2, the wind estimation apparatus 10 is mounted on a moving body 20. However, the wind estimation apparatus 10 may be provided away from the moving body 20. In that case, the wind estimation apparatus 10 and the moving body 20 can perform communication by wired or wireless connection. In the example in FIG. 2, the moving body 20 is a flying object. In the example in FIG. 2, the moving body 20 is specifically a drone. However, the moving body 20 is not limited to a flying object, and may be a vehicle that travels on a ground, a boat, and the like. While the moving body 20 moves, a camera 210 mounted on the moving body 20 captures an image around the moving body 20. The acquisition unit 110 of the wind estimation apparatus 10 acquires a target image from the camera 210.

A movement of the moving body 20 may be controlled by an operator, or may be automatically controlled. When a movement of the moving body 20 is controlled by an operator, the moving body 20 may be remotely operated, or may be operated by an operator who gets on the moving body 20. When a movement of the moving body 20 is automatically controlled, for example, a route on which the moving body 20 needs to move is preset. Further, control related to capturing by the camera 210 may be performed by an operator of the camera 210, or may be automatically performed in cooperation with a movement of the moving body 20. When control related to capturing by the camera 210 is performed by an operator of the camera 210, the camera 210 may be remotely operated, or may be operated by an operator who gets on the moving body 20.

One or more cameras 210 are mounted on the moving body 20. The wind estimation apparatus 10 can control a movement of the moving body 20, and the camera 210.

In FIG. 2, a capturing range (angle of view) of the camera 210 is indicated by broken lines. Further, an air current in a target region 50 is indicated by arrows. The target region 50 is a region where a situation of wind is to be estimated, and may be a two-dimensional or three-dimensional region. The target region 50 is a region of at least a part of a region around the moving body 20. A position of the target region 50 with respect to the moving body 20 may be fixed or may be variable. At least one target region 50 is preferably located on a traveling direction side of the moving body 20 with respect to the moving body 20. When the plurality of cameras 210 are mounted on the moving body 20, the wind estimation apparatus 10 may switch the camera 210 that captures a target image according to a direction of the target region 50 with respect to the moving body 20. Further, the plurality of cameras 210 may capture target images in a plurality of directions, and estimate a situation of wind in the plurality of directions. The target images in the plurality of directions may be captured at the same time, or may be successively captured.

A size of the target region 50 is not particularly limited. A target image is an image in which the target region 50 is captured. The target image is captured in a state where a distance from the center of the target region 50 to the camera 210 coincides with a focal distance of the camera 210. A distance from the center of the target region 50 and the camera 210, that is, a focal distance of the camera 210 when a target image is captured is, for example, equal to or more than 20 m and equal to or less than 40 m. The camera 210 is not particularly limited. An angle of view of the camera 210 may be, for example, 180° or 360°.

The acquisition unit 110 of the wind estimation apparatus 10 acquires a plurality of target images in time series. Each of the target images is an image constituting a moving image, that is, a frame image of a moving image. A frame rate of a moving image is not particularly limited, but may be, for example, equal to or more than 3 fps and equal to or less than 120 fps. A plurality of floating matters 52 such as dirt and dust are floating in the target region 50, and a trail of a movement of the floating matters 52 depends on a situation of wind in the target region 50. Thus, the estimation unit 130 of the wind estimation apparatus 10 determines a trajectory of the floating matter 52 in the plurality of target images in time series. Then, the estimation unit 130 estimates at least one of a direction and strength of wind, based on the determined trajectory. A size of the floating matter 52 is not particularly limited, but the floating matter 52 has a diameter of a circumscribed sphere of, for example, equal to or more than 10 pin and equal to or less than 1 mm. An estimation method performed by the estimation unit 130 will be described below in detail.

Figure 3:
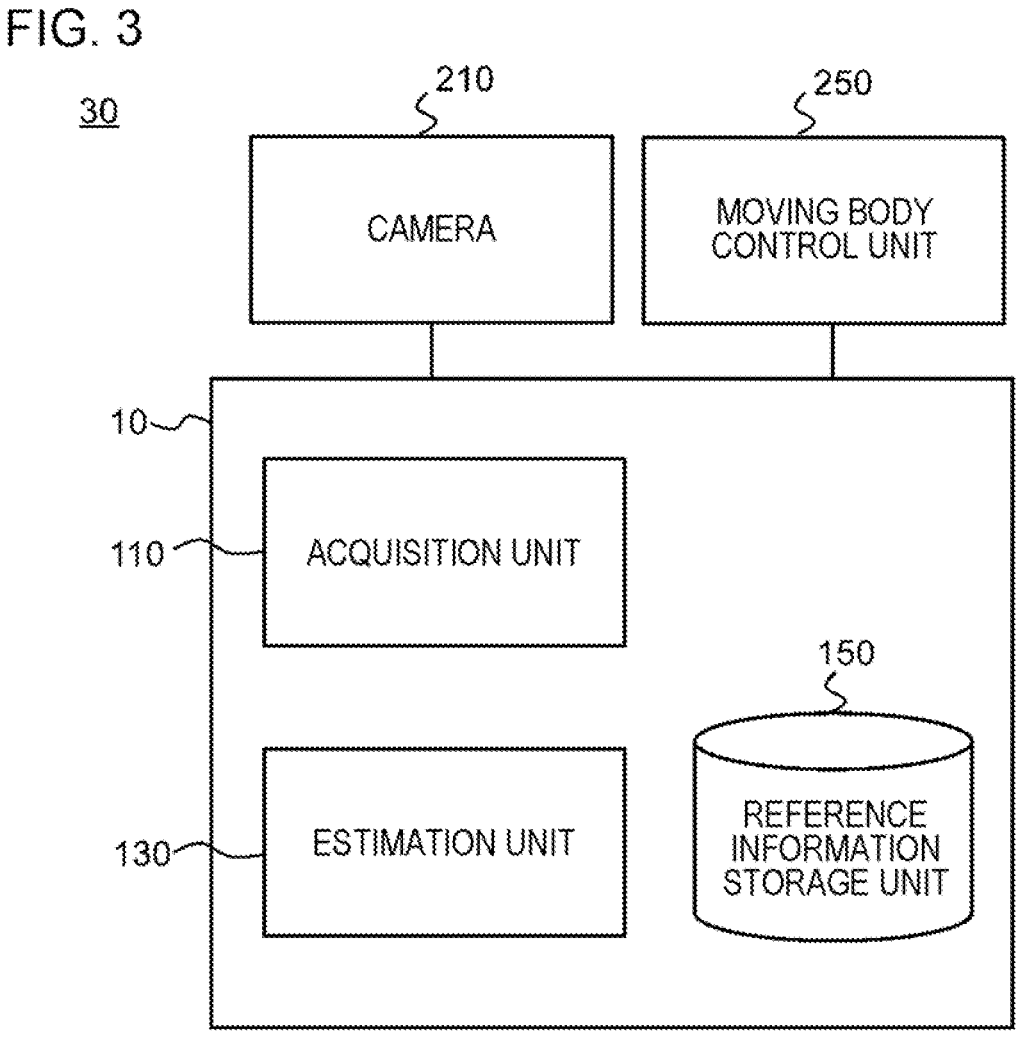
FIG. 3 is a block diagram illustrating a functional configuration of a wind estimation system according to the first example embodiment.

FIG. 3 is a block diagram illustrating a functional configuration of a wind estimation system 30 according to the present example embodiment. In an example in FIG. 3, the wind estimation system 30 includes the camera 210 and the wind estimation apparatus 10. The wind estimation system 30 may further include the moving body 20. In the example in FIG. 3, the wind estimation apparatus 10 further includes a reference information storage unit 150 that holds reference information. When a target image is captured by the camera 210, the acquisition unit 110 acquires the target image. The acquisition unit 110 may collectively acquire a plurality of target images being a series of time-series target images such as a moving image, for example. The acquisition unit 110 preferably acquires a plurality of target images corresponding to a predetermined time length.

The acquisition unit 110 further acquires information about a movement of the moving body 20 when a plurality of target images are captured. The information about a movement of the moving body 20 may be associated with the plurality of target images in advance.

Alternatively, the acquisition unit 110 may acquire the information about a movement of the moving body 20 from a sensor provided in the moving body 20 or a moving body control unit 250 that controls the movement of the moving body 20, and may associate the information with the plurality of target images. The information about a movement of the moving body 20 includes a velocity of the moving body 20, that is, a combination of a direction of a movement and a movement speed of the moving body 20. Note that, the direction of the movement herein is not an azimuth such as north, south, east, and west, and is preferably a direction (such as front, rear, left, right, up, and down) when viewed from the moving body 20. Herein, a predetermined direction when viewed from the moving body 20 can be defined as a front direction.

The estimation unit 130 estimates a situation of wind in the target region 50 by using the plurality of target images being acquired by the acquisition unit 110 and the reference information being read from the reference information storage unit 150. The estimation unit 130 outputs information about the estimated wind. The estimation unit 130 may output the information about the wind as an image to a display, or may output the information about the wind as a sound to a speaker. Alternatively, the estimation unit 130 may cause a storage unit and the like to hold the information about the wind. When the estimation unit 130 outputs the information about the wind as an image to a display that can be viewed by an operator of the moving body 20, or outputs, to a speaker, the information about the wind as a sound that can be heard by the operator of the moving body 20, the operator of the moving body 20 can recognize a situation of the wind around the moving body 20, and then appropriately operate the moving body 20. For example, the operator of the moving body 20 can move the moving body 20 while avoiding a region with a strong wind, and can evacuate the moving body 20 from a region with a strong wind.

A method for estimating a situation of wind by the estimation unit 130 will be described below in detail. However, the method for estimating a situation of wind by the estimation unit 130 is not limited to the following method. The estimation unit 130 estimates at least one of a direction and strength of wind by further using, in addition to a target image, reference information about a trajectory of the floating matter 52 being prepared for each movement pattern of the moving body 20.

The reference information is information indicating a trajectory. The reference information will be described below in detail. The movement pattern is, for example, a movement velocity, that is, a combination of a direction of a movement and a movement speed.

The reference information is prepared for each movement pattern, and thus a situation of wind can be estimated by using a captured target image while taking various movement patterns. Therefore, a situation of wind at a next movement destination can be estimated while the moving body 20 is moving.

The estimation unit 130 determines, by using a plurality of target images in time series, a trajectory of each of the plurality of floating matters 52 included in the target images. The estimation unit 130 can determine a trail of each of the floating matters 52 by tracking each of the floating matters 52 over the plurality of target images.

Then, the estimation unit 130 generates information indicating a first target trajectory being acquired by removing a trajectory that satisfies a predetermined condition from trajectories of the floating matters 52 determined in the plurality of target images in time series. The trajectory that satisfies the predetermined condition is a trajectory estimated to be a trajectory of the floating matter 52 located in a region close to the moving body 20. By removing the trajectory that satisfies the predetermined condition from the trajectories of the floating matters 52 determined in the target images, the information indicating the first target trajectory estimated to be located in the target region 50 away at some distance from the moving body 20 is acquired. Note that, when a plurality of trajectories are acquired as a result of removing the trajectory that satisfies the predetermined condition from the trajectories of the floating matters 52 determined in the target images, an average of the trajectories can be set as the first target trajectory.

As described above, the target image is captured in a state where a distance from the center of the target region 50 to the camera 210 coincides with a focal distance of the camera 210. However, in the target image, not only the floating matter 52 located in the target region 50 but also the floating matter 52 located between the moving body 20 and the target region 50, for example, the floating matter 52 located extremely close to the moving body 20 is captured. The estimation unit 130 can accurately estimate a situation of wind in the target region 50 by removing the trajectory that satisfies the predetermined condition from the trajectories of the floating matters 52 determined in the target images. The predetermined condition will be described below in detail.

The estimation unit 130 reads and acquires reference information needed to be used from among a plurality of pieces of the reference information held in the reference information storage unit 150, based on information about a movement of the moving body 20 being associated with a target image being a processing target. Herein, the estimation unit 130 acquires the reference information associated with a movement pattern indicated by the information about the movement of the moving body 20.

The reference information is information indicating a first reference trajectory being acquired by removing a trajectory that satisfies a predetermined condition from trajectories of the plurality of floating matters 52 determined in a first image captured in a substantially windless state. The substantially windless state is specifically a state where strength of wind is equal to or less than predetermined strength. Herein, the predetermined strength can be set as a value equal to or more than 1.0 m/s and equal to or less than 2.0 m/s, for example.

The predetermined condition can be the same condition as a condition used for generating the information indicating the first target trajectory. In other words, the first reference trajectory corresponds to a trajectory of the floating matter 52 present in a region associated with the target region 50 when viewed from the moving body 20 in a substantially windless state.

The estimation unit 130 estimates at least one of a direction and strength of wind, based on a difference between the first target trajectory and the first reference trajectory indicated by the read reference information. The information indicating a trajectory may be, for example, information $(v_1, v_2, \ldots, v_t, \ldots, v_n)$ indicating, in time series, each vector indicating a movement of the floating matter 52 between a plurality of points in time. Each vector $v_t$ may be a two-dimensional vector indicating a movement in an image. Each of a plurality of points in time t may be associated with each of a plurality of target images. However, each of the plurality of points in time t may not be associated with each of the plurality of target images. For example, one or more points in time may be complemented in such a way as to indicate a trajectory estimated from the plurality of target images. The estimation unit 130 associates each of a plurality of vectors $(v_{r1}, v_{r2}, \ldots, v_{rt}, \ldots, v_{rn})$ indicating a first reference trajectory and each of a plurality of vectors $(v_{s1}, v_{s2}, \ldots, v_{st}, \ldots, v_{sn})$ indicating a first target trajectory with each other in time series. Then, an estimated vector $v_{et}$ at each point in time is acquired by subtracting the vector $v_{rt}$ of the first reference trajectory associated with the vector $v_{st}$ of the first target trajectory from the vector $v_{st}$. The acquired estimated vectors $(v_{e1}, v_{e2}, \ldots, v_{et}, \ldots, y_{en})$ in time series indicate an estimated trajectory of wind in the target region 50. Furthermore, the estimation unit 130 may compute an average vector of the plurality of acquired estimated vectors $v_{e1}$ to $y_{en}$. Then, the estimation unit 130 sets each of a direction and a speed indicated by the computed average vector as an estimated result of a direction and a speed of wind in the target region 50.

Note that, a trajectory of the floating matter 52 is often assumed to be linear, and thus each trajectory may be indicated by each one vector. In that case, an estimated vector may be acquired by subtracting a vector indicating a first reference trajectory from a vector indicating a first target trajectory. In that case, the estimation unit 130 sets each of a direction and a speed indicated by the estimated vector as an estimated result of a direction and a speed of wind in the target region 50.

Note that, a configuration of the information indicating a trajectory is not limited to the example described above.

The estimation unit 130 outputs an estimated result. The estimation unit 130 can display an estimated result on a display that can be visually recognized by a user such as an operator of the moving body 20, for example.

Figure 4:
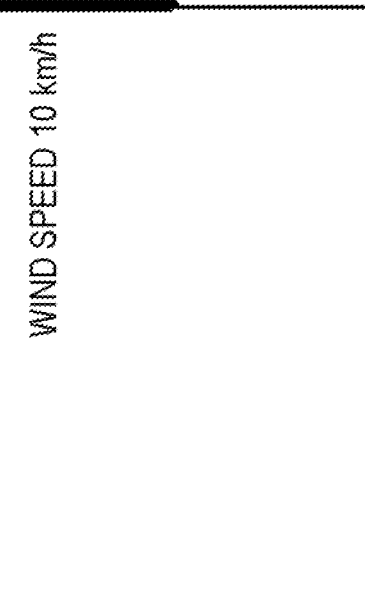
FIG. 4 is a diagram illustrating a display method of an estimated result.

FIG. 4 is a diagram illustrating a display method of an estimated result. For example, an image captured by any camera 210 of the moving body 20 or a map of an area in which the moving body 20 moves is displayed in a rectangle in FIG. 4. Herein, a portion of an outer frame of the rectangle located in a traveling direction of the moving body 20 is emphasized and displayed. The emphasized display is performed by, for example, changing a line width and a color of a line. Specifically, a line width of the emphasized and displayed portion is displayed thicker than another portion. Herein, as strength of an estimated wind is stronger, the line width may be thicker. Alternatively, the emphasized and displayed portion may be displayed in red, and another portion may be displayed in black. Further, both of the display manners may be performed. In an example in FIG. 4, a wind speed is further displayed by a numerical value. When the moving body 20 is a flying object, an operator of the moving body 20 can perform an operation of, for example, adjusting the rotation speed of a propeller according to a wind speed, and the like.

In addition, the estimation unit 130 may output an estimated result to a speaker. A sound such as a "wind at 10 kilometers an hour is blowing to the right in front", for example, can be output from the speaker in such a way as to be able to be heard by a user. Further, when strength of an estimated wind is equal to or more than a predetermined threshold value, the estimation unit 130 may output an alert as display on the display or a sound from the speaker. Since the wind estimation apparatus 10 according to the present example embodiment can also detect a local strong wind, the moving body 20 can be stably moved while avoiding a region where a local strong wind is blowing.

Further, the estimation unit 130 may generate and update a library including a situation of wind in the target region 50 and a situation around the moving body 20. In the library, a situation of wind in the target region 50 being estimated by the estimation unit 130, position information about the target region 50, a date and time at which the situation of the wind is estimated, a temperature when the situation of the wind is estimated, and weather when the situation of the wind is estimated are registered. A receiver of a global navigation satellite system (GNSS) and an azimuth sensor are provided in the moving body 20, and the estimation unit 130 can acquire position information about the moving body 20 acquired by using the GNSS, and position information about the target region 50, based on a position relationship between the moving body 20 and the target region 50. The estimation unit 130 may receive, from a server that provides weather information and the like via a communication network, a temperature when a situation of wind is estimated and weather when the situation of the wind is estimated, and may acquire the temperature and the weather from a sensor provided in the moving body 20 and the like.

The wind estimation apparatus 10 may be configured in such a way that a user can confirm a content of the library at a desired timing. As one example, a content of the library is displayed on the display by a user performing a predetermined operation (for example, an operation of touching a "library" button) on a touch pad and the like provided in the wind estimation apparatus 10. A user of the wind estimation apparatus 10 can recognize a trend of an environment by viewing past information in the library.

<Reference Information>

The reference information will be described below in detail. As described above, the reference information is information indicating a first reference trajectory being acquired by removing a trajectory that satisfies a predetermined condition from trajectories of the plurality of floating matters 52 determined in a first image.

The first image can be captured in advance in a state where the moving body 20 is moved in a space such as an inside of a building. The first image may be an image constituting a moving image. The moving body 20 and the camera 210 used for capturing the first image are each preferably the same type as the moving body 20 and the camera 210 that capture a target image. Further, a capturing condition when the first image is captured and a capturing condition when the target image is captured are preferably the same. An attachment position and an orientation of the camera 210 that captures the first image with respect to the moving body 20 and an attachment position and an orientation of the camera 210 that captures the target image with respect to the moving body 20 are preferably the same. The reason is that a trajectory to be acquired and a way of the floating matter 52 being captured in an image may vary, depending on a shape of the moving body 20, a way of attaching the camera 210, a capturing condition of the camera 210, and the like.

The first image is captured for each of a plurality of movement patterns of the moving body 20, and reference information associated with each of the movement patterns can be acquired by using each first image. Specifically, by using a plurality of first images in time series, a trajectory of each of the plurality of floating matters 52 included in the first images is determined. A trail of each of the floating matters 52 can be determined by tracking each of the floating matters 52 over the plurality of first images. A first reference trajectory is determined by removing a trajectory that satisfies a predetermined condition from trajectories of the plurality of determined floating matters 52. Each piece of the reference information is held in association with a movement pattern or a range of the movement pattern in the reference information storage unit 150. Note that, when a plurality of trajectories are acquired as a result of removing the trajectory that satisfies the predetermined condition from the trajectories of the floating matters 52 determined in the first images, an average of the trajectories can be set as the first reference trajectory.

FIG. 5 is a diagram illustrating a configuration of reference information. FIG. 5 illustrates an example in which each piece of the reference information is associated with a range of a movement pattern. A "range of a direction of a movement" indicates a range of an angle formed between a predetermined front direction of the moving body 20 and a movement direction. A "range of a movement speed" indicates a range of a movement speed of the moving body 20. A first reference trajectory is associated with each combination of the "range of a direction of a movement" and the "range of a movement speed". The estimation unit 130 can read and use the first reference trajectory associated with a combination to which a direction and a speed of a movement of the moving body 20 when a target image being a processing target is captured belong.

Note that, each piece of the reference information may include information indicating the first reference trajectory for each partial region in an image. The reason is that a trajectory to be regarded by an image may vary, depending on whether a right region or a left region of the image, and whether an upper region or a lower region of the image. Herein, each of a plurality of regions acquired by dividing an image (a target image or a first image) is assumed to be a partial region. For example, it is defined that a trajectory belongs to a partial region including most portions (for example, a longest distance) of the trajectory.

In a case where the reference information includes information indicating a first reference trajectory for each partial region in an image, when the estimation unit 130 derives a difference between a first target trajectory and the first reference trajectory, the estimation unit 130 derives a difference between the first target trajectory and the first reference trajectory being associated with a mutually associated partial region (that is, a partial region in the same position in the image).

<Predetermined Condition>

A predetermined condition will be described below in detail. As described above, the predetermined condition is a condition for removing the floating matter 52 located sufficiently close to the camera 210 with reference to a focal distance of the camera 210 when an image is captured. Examples of the predetermined condition include a first example to a fourth example below. Further, a combination of a plurality of conditions according to the examples may be used as the predetermined condition. For example, when at least any of the plurality of conditions is satisfied, it can be defined that the predetermined condition is satisfied. Alternatively, when a predetermined number or more of the plurality of conditions is satisfied, it can be defined that the predetermined condition is satisfied. Note that, in description of the first example to the fourth example below, a first image and a target image in which determination whether each trajectory satisfies the predetermined condition needs to be performed are collectively referred to as a "determination target image".

First Example

The first example of the predetermined condition is a condition related to a blur amount of the floating matter 52 in the determination target image. Since the floating matter 52 located near the camera 210 is out of focus, such a floating matter 52 is in a blur state in the determination target image. Therefore, determination based on a blur amount can be performed. Specifically, the estimation unit 130 determines, for a trajectory being a determination target, a blur amount of the floating matter 52 getting on the trajectory in each determination target image in time series. The estimation unit 130 computes an average of the determined blur amounts. When the average of the computed blur amounts is equal to or more than a predetermined threshold value, the estimation unit 130 determines that the trajectory satisfies the predetermined condition. Note that, the determination of a blur amount in each determination target image can be performed by using an existing technique such as edge detection.

Second Example

The second example of the predetermined condition is a condition related to a size of the floating matter 52 in the determination target image. Even with the floating matters 52 in the same size, the floating matter 52 closer to the camera 210 is captured larger in the determination target image. Further, the floating matter 52 located near the camera 210 is captured to be more expanded due to the camera 210 being out of focus. Therefore, determination based on a size of the floating matter 52 can be performed. Specifically, the estimation unit 130 determines, for a trajectory being a determination target, a size of the floating matter 52 getting on the trajectory in each determination target image in time series. The estimation unit 130 computes an average of the determined sizes. When the average of the computed sizes is equal to or more than a predetermined threshold value, the estimation unit 130 determines that the trajectory satisfies the predetermined condition.

Third Example

The third example of the predetermined condition is a condition related to a movement distance of the floating matter 52 in the determination target images in time series. Even when the floating matter 52 moves the same distance, the floating matter 52 closer to the camera 210 has a longer movement distance in the determination target images in time series. Therefore, determination based on a movement distance can be performed. Specifically, the estimation unit 130 determines a length of each trajectory, that is, a movement distance of the floating matter 52 in the determination target images (a plurality of determination images) in time series. Then, the estimation unit 130 determines that a trajectory from the top to M % in order of length among a plurality of trajectories satisfies the predetermined condition. A value of M can be, for example, equal to or more than 5 and equal to or less than 30.

Fourth Example

The fourth example of the predetermined condition is a condition generated by using a second image captured by a camera in a state where a focal distance is shorter than that of the first image. For example, the first image is an image captured by a camera in a state where a focal distance is equal to or more than 20 m and equal to or less than 40 m, and the second image is an image captured by a camera in a state where a focal distance is equal to or more than 1 m and equal to or less than 10 m. The first image includes both of the floating matter 52 (hereinafter, referred to as a "short-range floating matter") located near a focus of the second image, and the floating matter 52 (hereinafter, referred to as a "target floating matter") located near a focus of the first image. Meanwhile, the second image includes only the short-range floating matter, and does not include the target floating matter. Therefore, a trajectory of the floating matter 52 (that is, the short-range floating matter) included in the second image can be formed into a model, and a trajectory that matches a pattern of the model can be set as a trajectory that satisfies the predetermined condition.

Examples of a method for forming a trajectory of the floating matter 52 included in the second image into a model include extraction of a feature value of a trajectory. Further, the estimation unit 130 may determine whether each trajectory satisfies the predetermined condition by using a determination model generated by machine learning. The determination model can be acquired by performing machine learning by using, for example, the second image in time series or a trajectory determined from the second image in time series as training data. Further, the first image in time series in which each trajectory is provided with a label of whether the trajectory indicates the short-range floating matter or the target floating matter may be further used as training data for the machine learning.

The estimation unit 130 inputs a determination target image in time series to such a determination model. Then, the estimation unit 130 can acquire, as an output of the determination model, information that can identify whether each trajectory indicates the short-range floating matter or the target floating matter. The estimation unit 130 sets a trajectory indicates the short-range floating matter as a trajectory that satisfies the condition.

The predetermined condition is described above.

A hardware configuration of the wind estimation apparatus 10 will be described below. Each functional component unit (the acquisition unit 110 and the estimation unit 130) of the wind estimation apparatus 10 may be achieved by hardware (for example, a hard-wired electronic circuit, and the like) that achieves each functional component unit, and may be achieved by a combination of hardware and software (for example, a combination of an electronic circuit and a program that controls the electronic circuit, and the like). Hereinafter, a case where each functional component unit of the wind estimation apparatus 10 is achieved by the combination of hardware and software will be further described.

Figure 6:
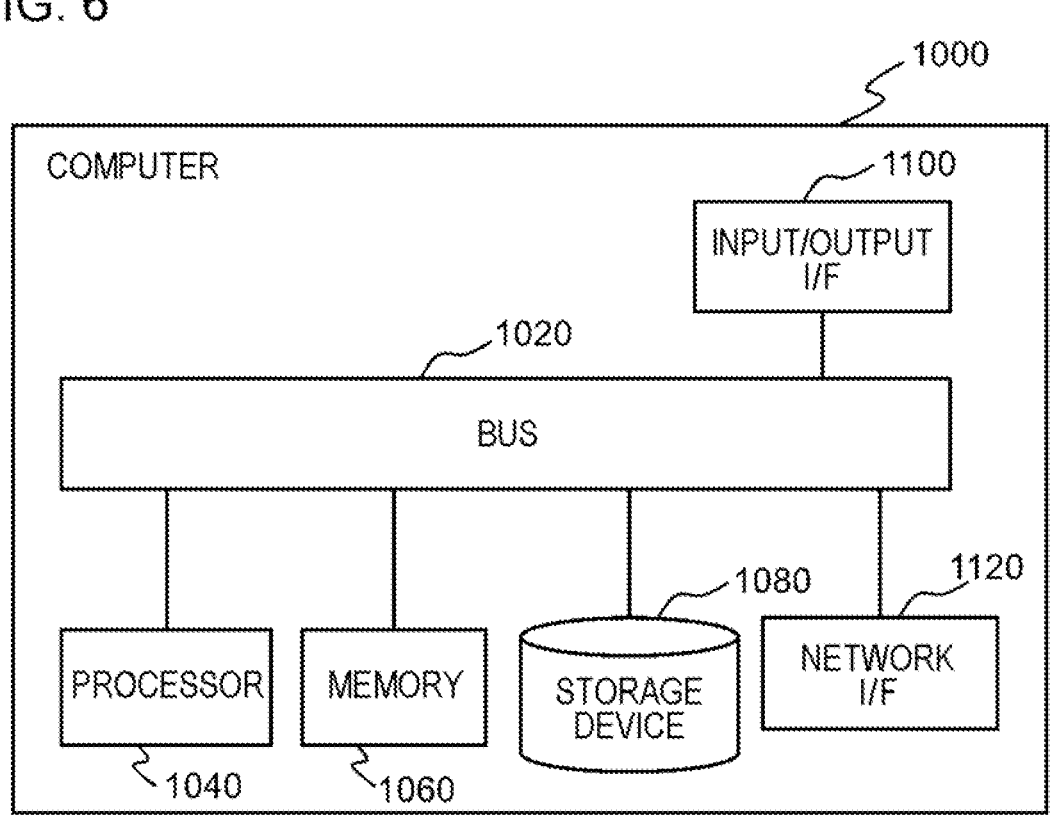
FIG. 6 is a diagram illustrating a computer for achieving the wind estimation apparatus.

FIG. 6 is a diagram illustrating a computer 1000 for achieving the wind estimation apparatus 10. The computer 1000 can be any computer. For example, the computer 1000 is a system on chip (SoC), a personal computer (PC), a server machine, a tablet terminal, a smartphone, or the like. The computer 1000 may be a dedicated computer designed for achieving the wind estimation apparatus 10, and may be a general-purpose computer. Further, the wind estimation apparatus 10 may be achieved by one computer 1000, or may be achieved by a combination of a plurality of the computers 1000.

The computer 1000 includes a bus 1020, a processor 1040, a memory 1060, a storage device 1080, an input/output interface 1100, and a network interface 1120. The bus 1020 is a data transmission path for allowing the processor 1040, the memory 1060, the storage device 1080, the input/output interface 1100, and the network interface 1120 to transmit and receive data with one another. However, a method of connecting the processor 1040 and the like to each other is not limited to bus connection. The processor 1040 may be various types of processors such as a central processing unit (CPU), a graphics processing unit (GPU), or a field-programmable gate array (FPGA). The memory 1060 is a main storage apparatus achieved by using a random access memory (RAM) and the like. The storage device 1080 is an auxiliary storage device achieved by using a hard disk, a solid state drive (SSD), a memory card, a read only memory (ROM), or the like.

The input/output interface 1100 is an interface for connecting the computer 1000 and an input/output device. For example, an input apparatus such as a keyboard and a touch panel and an output apparatus such as a display are connected to the input/output interface 1100. A method for connecting the input/output interface 1100 to the input apparatus and the output apparatus may be wireless connection or wired connection.

The network interface 1120 is an interface for connecting the computer 1000 to a network. The communication network is, for example, a local area network (LAN) and a wide area network (WAN). A method for connecting the network interface 1120 to the network may be wireless connection or wired connection.

The storage device 1080 stores a program module that achieves each functional component unit of the wind estimation apparatus 10. The processor 1040 achieves a function associated with each program module by reading each of the program modules to the memory 1060 and executing the program module.

Further, when the reference information storage unit 150 is provided inside the wind estimation apparatus 10, for example, the reference information storage unit 150 is achieved by using the storage device 1080. However, the reference information storage unit 150 may be provided outside the wind estimation apparatus 10.

A hardware configuration of a computer that achieves the moving body control unit 250 of the moving body 20 is represented in FIG. 6, for example, similarly to the wind estimation apparatus 10. However, a program module that achieves a function of the moving body control unit 250 according to the present example embodiment is stored in the storage device 1080 of the computer 1000 that achieves the moving body control unit 250 according to the present example embodiment. The computer 1000 that achieves the moving body control unit 250 may function as the computer 1000 that achieves the wind estimation apparatus 10.

Figure 7:
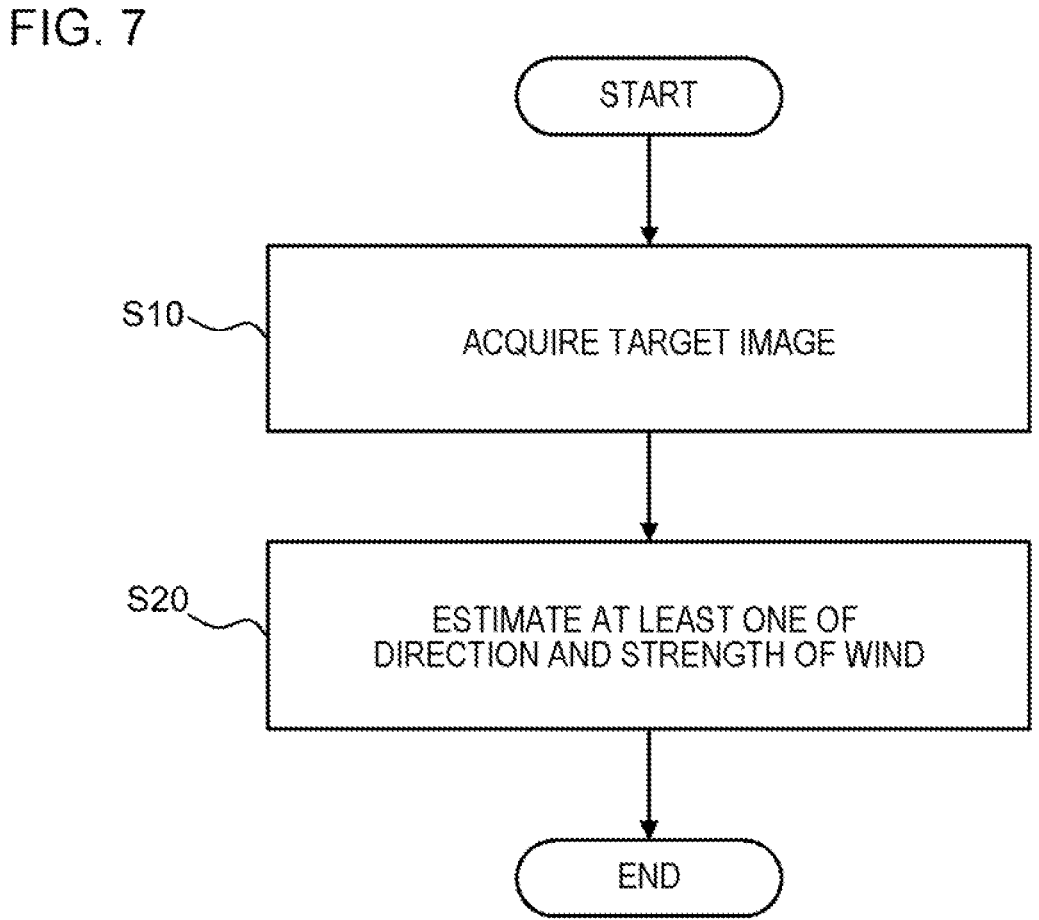
FIG. 7 is a diagram illustrating an overview of a wind estimation method according to the first example embodiment.

FIG. 7 is a diagram illustrating an overview of a wind estimation method according to the present example embodiment. The wind estimation method according to the present example embodiment is executed by one or more computers. The wind estimation method according to the present example embodiment includes an acquisition step S10 and an estimation step S20. In the acquisition step S10, a target image of the target region 50 is acquired. In the estimation step S20, at least one of a direction and strength of wind in the target region 50 is estimated by using the target image.

The present wind estimation method may be executed by the wind estimation apparatus according to the present example embodiment.

In the wind estimation method according to the present example embodiment, estimation may be always performed during a movement of the moving body 20, or estimation may be performed when a predetermined operation by an operator is performed on the wind estimation apparatus 10. When estimation is always performed during a movement of the moving body 20, capturing by the camera 210 starts upon a start of a movement of the moving body 20. Then, the acquisition unit 110 acquires a target image acquired by the camera 210, and the estimation unit 130 estimates a situation of wind. On the other hand, when estimation is performed upon a predetermined operation by an operator being performed, the operator performs an operation for estimating a situation of wind on a touch panel and the like provided in the wind estimation apparatus 10 during a movement of the moving body 20. For example, a "wind estimation" button is touched. Then, the acquisition unit 110 acquires a target image acquired by the camera 210, based on the operation, and the estimation unit 130 similarly estimates a situation of wind. Note that, capturing by the camera 210 and acquisition of an image by the acquisition unit 110 may continue during a movement of the moving body 20 regardless of whether a predetermined operation is performed. In other words, at least estimation by the estimation unit 130 is performed based on a predetermined operation.

FIG. 8 is a flowchart illustrating a flow of the wind estimation method according to the present example embodiment. In step S100, the acquisition unit 110 acquires a plurality of target images. In step S101, the estimation unit 130 determines one or more trajectories of the floating matter 52 in a plurality of target images. In step S102, the estimation unit 130 generates information indicating a first target trajectory by removing a trajectory that satisfies a predetermined condition from the one or more determined trajectories. In step S103, the estimation unit 130 reads and acquires reference information needed to be used from among a plurality of pieces of reference information held in the reference information storage unit 150, based on information about a movement of the moving body 20. In step S104, the estimation unit 130 computes a difference between the first target trajectory and a first reference trajectory indicated by the reference information. Further, the estimation unit 130 acquires an estimated result of at least one of a direction and strength of wind, based on the acquired difference. In step S105, the estimation unit 130 outputs the acquired estimated result.

As described above, according to the present example embodiment, the estimation unit 130 estimates at least one of a direction and strength of wind in a target region by using a target image. Therefore, a situation of the wind can be easily recognized.

Second Example Embodiment

Figure 9:
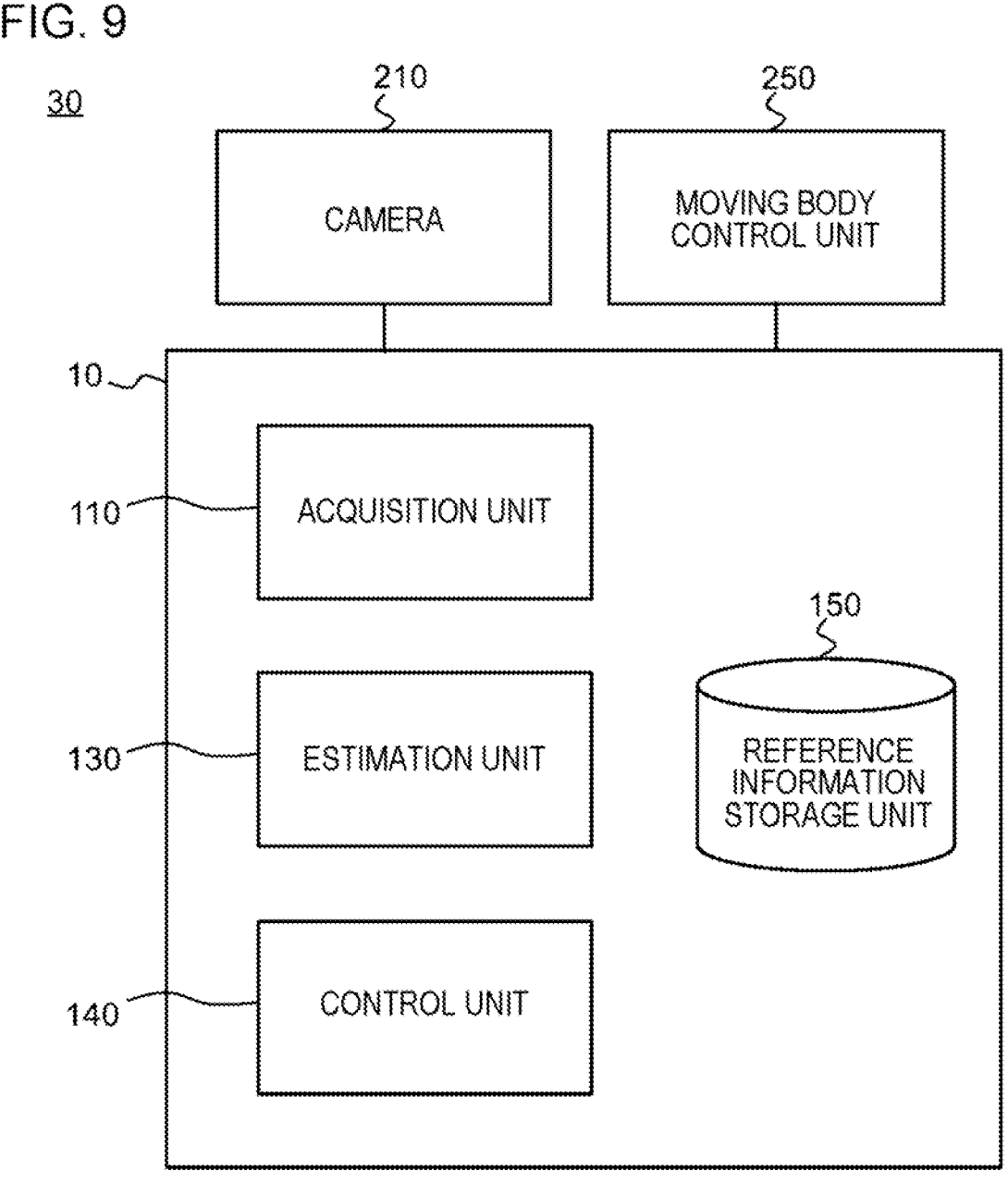
FIG. 9 is a block diagram illustrating a functional configuration of a wind estimation system according to a second example embodiment.

FIG. 9 is a block diagram illustrating a functional configuration of a wind estimation system 30 according to a second example embodiment. The wind estimation system 30 according to the present example embodiment is the same as the wind estimation system 30 according to the first example embodiment except for points described below. A wind estimation apparatus 10 according to the present example embodiment further includes a control unit 140.

In the present example embodiment, a moving body 20 is a flying object, and the control unit 140 controls flying of the moving body 20. The control unit 140 controls flying of the moving body 20, based on at least one of a direction and strength of wind estimated by an estimation unit 130. The control unit 140 can control the moving body 20 by, for example, outputting a control signal to a moving body control unit 250.

As an example, when there is a target region 50 where a strong wind is estimated by the estimation unit 130, the control unit 140 controls the moving body 20 in such a way as to avoid the target region 50 where the strong wind is estimated. The target region 50 where the strong wind is estimated is, for example, the target region 50 where strength of an estimated wind is equal to or more than a predetermined threshold value. As control for avoiding the target region 50 where the strong wind is estimated, specifically, the control unit 140 can stop the moving body 20 or retreat the moving body 20 by a predetermined distance to a route by which the moving body arrives. Alternatively, a pattern of an avoidance route may be set in advance, and the control unit 140 may move the moving body 20 along the avoidance route. When a situation of wind in each of the target regions 50 in a plurality of directions with respect to the moving body 20 is estimated, the control unit 140 may move the moving body 20 to a direction of the target region 50 with a weakest wind among the plurality of target regions 50.

Further, the control unit 140 may determine a movement pattern that needs to be taken by the moving body 20, based on a situation around the moving body 20. For example, the control unit 140 can perform determination whether to move the moving body 20 into the target region 50 by using a model generated by machine learning. Information about the library described in the first example embodiment can be used for learning of the model. Specifically, training data are acquired by providing a movement pattern (for example, any of front, rear, up, down, left, and right) that needs to be taken by the moving body 20 to data included in the library about a situation of wind in the target region 50 and a situation around the moving body 20.

The control unit 140 inputs, to the learned model, a situation of wind in the target region 50 being estimated by the estimation unit 130, position information about the target region 50, a date and time at which the situation of the wind is estimated, a temperature when the situation of the wind is estimated, and weather when the situation of the wind is estimated. Then, the control unit 140 acquires, as an output of the model, a movement pattern that needs to be taken by the moving body 20. The control unit 140 moves the moving body 20, based on the acquired movement pattern.

A hardware configuration of a computer that achieves the wind estimation apparatus 10 according to the present example embodiment is represented in FIG. 6, for example, similarly to the wind estimation apparatus 10 according to the first example embodiment. However, a program module that achieves a function of the control unit 140 according to the present example embodiment is further stored in a storage device 1080 of a computer 1000 that achieves the wind estimation apparatus 10 according to the present example embodiment.

Next, action and an example effect of the present example embodiment will be described. In the present example embodiment, action and an effect similar to those in the first example embodiment can be acquired. In addition, the control unit 140 controls flying of the moving body 20, based on at least one of a direction and strength of wind estimated by the estimation unit 130. Therefore, the moving body 20 can be more stably moved.

Third Example Embodiment

Figure 10:
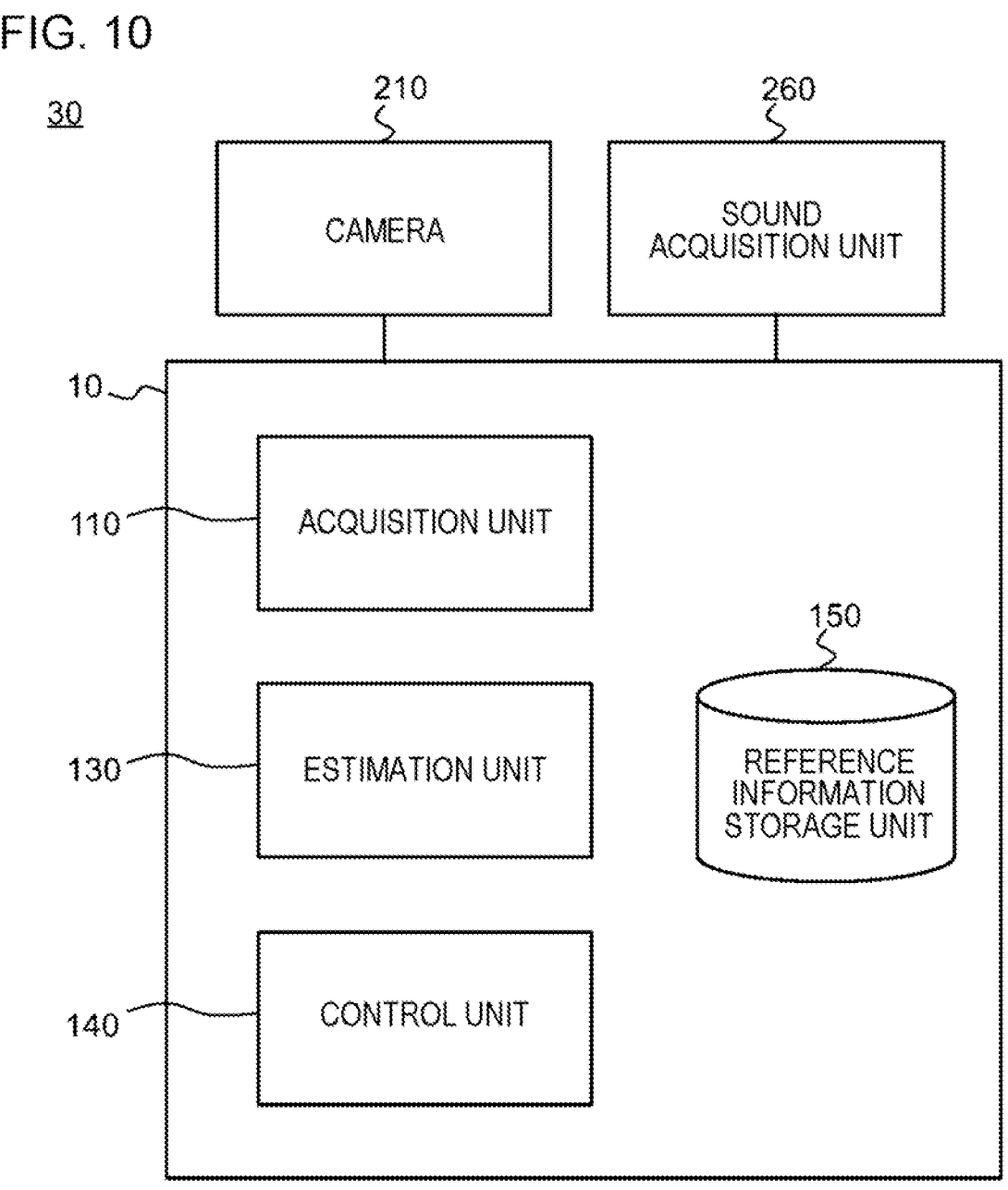
FIG. 10 is a block diagram illustrating a functional configuration of a wind estimation system according to a third example embodiment.

FIG. 10 is a block diagram illustrating a functional configuration of a wind estimation system 30 according to a third example embodiment. The wind estimation system 30 according to the present example embodiment is the same as the wind estimation system 30 according to at least any of the first and second example embodiments except for points described below.

A wind estimation apparatus 10 according to the present example embodiment includes a control unit 140. The control unit 140 controls a sound acquisition unit 260 that acquires a sound around a moving body 20. The control unit 140 controls the sound acquisition unit 260, based on at least one of a direction and strength of wind estimated by an estimation unit 130. The sound acquisition unit 260 is, for example, a microphone. The sound acquisition unit 260 has at least one of a noise canceling function and a directivity variable function.

For example, sound data acquired by the sound acquisition unit 260 are output from a speaker when an image generated by a camera 210 is displayed.

For example, the control unit 140 increases a degree of noise canceling as wind estimated by the estimation unit 130 is stronger. In this way, a noise sound by wind can be appropriately reduced. Further, the control unit 140 controls directivity of the sound acquisition unit 260 in such a way that the sound acquisition unit 260 easily acquires a sound from a leeward side, based on a direction of wind estimated by the estimation unit 130. In this way, a sound from a region where a sound is hardly acquired can be collected. When the moving body 20 is used for searching for a person who needs to be rescued at a disaster site and the like, each control makes it easier to catch a sign of a support request from a person who needs to be rescued.

A hardware configuration of a computer that achieves the wind estimation apparatus 10 according to the present example embodiment is represented in FIG. 6, for example, similarly to the wind estimation apparatus 10 according to the first example embodiment. However, a program module that achieves a function of the control unit 140 according to the present example embodiment is further stored in a storage device 1080 of a computer 1000 that achieves the wind estimation apparatus 10 according to the present example embodiment.

Next, action and an example effect of the present example embodiment will be described. In the present example embodiment, action and an effect similar to those in at least any of the first and second example embodiments can be acquired. In addition, the control unit 140 according to the present example embodiment controls the sound acquisition unit 260, based on at least one of a direction and strength of wind estimated by the estimation unit 130. Therefore, an influence of wind on acquisition of a sound can be reduced.

Fourth Example Embodiment

Figure 11:
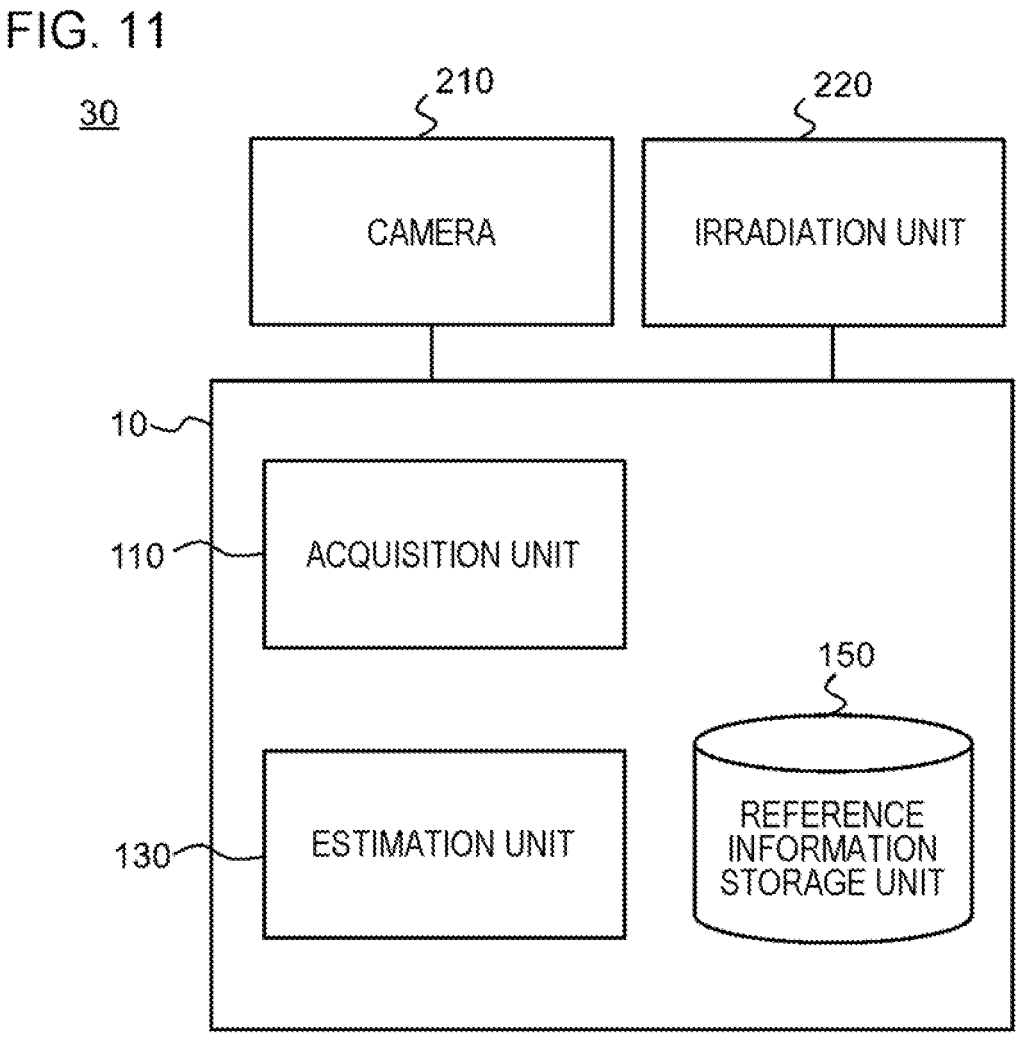
FIG. 11 is a block diagram illustrating a functional configuration of a wind estimation system according to a fourth example embodiment.

FIG. 11 is a block diagram illustrating a functional configuration of a wind estimation system 30 according to a fourth example embodiment. The wind estimation system 30 according to the present example embodiment is the same as the wind estimation system 30 according to at least any of the first to third example embodiments except for points described below.

The wind estimation system 30 according to the present example embodiment further includes an irradiation unit 220. The irradiation unit 220 irradiates light to a target region 50. A camera 210 generates an image of the target region 50 in a state where light is irradiated from the irradiation unit 220. The acquisition unit 110 acquires, as a target image, an image of the target region 50 in a state where light is irradiated from the irradiation unit 220.

The irradiation unit 220 is, for example, a lighting device. The irradiation unit 220 is provided in a moving body 20. The moving body 20 may include a plurality of the irradiation units 220 in such a way as to be able to irradiate light in a plurality of directions. Further, an irradiation direction of the irradiation unit 220 may be variable. Irradiation of light from the irradiation unit 220 to the target region 50 may be performed only in a period in which the camera 210 captures the target region 50, or may be further performed in the other period. When light is irradiated from the irradiation unit 220 to the target region 50, reflected light from a floating matter 52 is incident on the camera 210. Therefore, the floating matter 52 is more clearly recognized in a target image. Output light from the irradiation unit 220 is preferably straight light.

In the present example embodiment, the camera 210 has contrast adjusted in such a way that the floating matter 52 is easily recognized by reflected light. Further, the camera 210 may have sensitivity for a wavelength of output light of the irradiation unit 220 higher than another wavelength.

When the first image and the second image described in the first example embodiment are captured, light is preferably irradiated from the irradiation unit 220 to a region to be captured also at a time of capturing of the images, similarly to the target region 50.

Next, action and an example effect of the present example embodiment will be described. In the present example embodiment, action and an effect similar to those in at least any of the first to third example embodiments can be acquired. In addition, the wind estimation system 30 according to the present example embodiment includes the irradiation unit 220 that irradiates light to the target region 50. Therefore, the floating matter 52 is more clearly recognized in a target image. Thus, estimation accuracy of a situation of wind improves.

Other Example Embodiment

Figure 12:
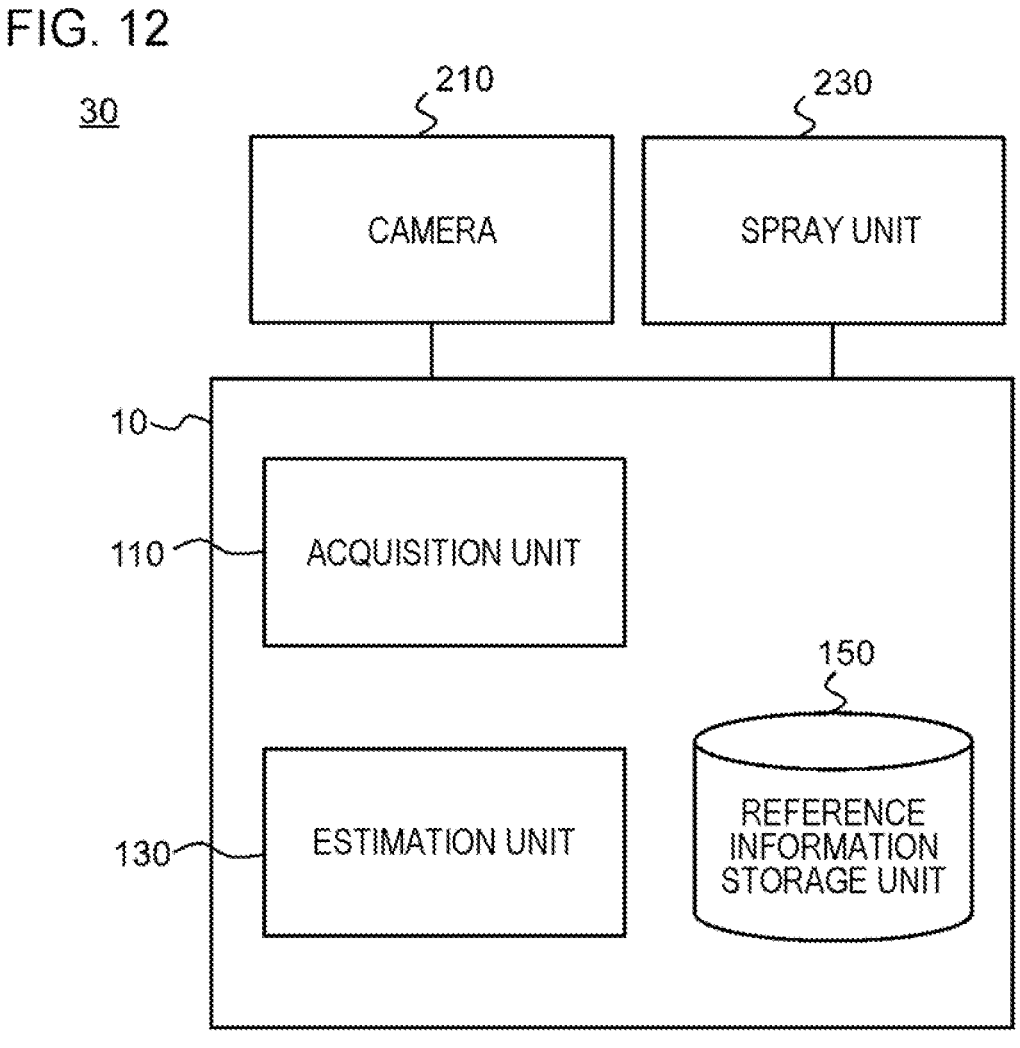
FIG. 12 is a block diagram illustrating a functional configuration of a wind estimation system according to another example embodiment.

FIG. 12 is a block diagram illustrating a functional configuration of a wind estimation system 30 according to another example embodiment. The wind estimation system 30 according to the present example embodiment is the same as the wind estimation system 30 according to at least any of the first to fourth example embodiments except for points described below.

The wind estimation system 30 according to the present example embodiment further includes a spray unit 230. The spray unit 230 sprays a particle to be a floating matter 52 to a target region 50. The spray unit 230 is, for example, a sprayer. For example, the spray unit 230 can spray water as a particle to be the floating matter 52. In this way, as compared to a case where dust and dirt unexpectedly present on a spot are recognized as the floating matter 52, an image can be acquired in a state with a controlled condition of the floating matter 52, such as the number, distribution, and a size of the floating matter 52, for example, under a unified condition, and a situation of wind can be estimated. Thus, estimation accuracy of wind can be improved.

When the first image and the second image described in the first example embodiment are captured, a particle is preferably sprayed from the spray unit 230 to a region to be captured also at a time of capturing of the images, similarly to the target region 50.

Next, action and an example effect of the present example embodiment will be described. In the present example embodiment, action and an effect similar to those in at least any of the first to fourth example embodiments can be acquired. In addition, the wind estimation system 30 according to the present example embodiment includes the spray unit 230 that sprays a particle to be the floating matter 52 to the target region 50. Therefore, an image can be acquired in a state with a controlled condition of the floating matter 52, and a situation of wind can be estimated. Thus, estimation accuracy of the wind can be improved.

While the example embodiments of the present invention have been described with reference to the drawings, the example embodiments are only exemplification of the present invention, and various configurations other than the above-described example embodiments can also be employed.

Further, the plurality of steps (pieces of processing) are described in order in the plurality of flowcharts used in the above-described description, but an execution order of steps performed in each of the example embodiments is not limited to the described order. In each of the example embodiments, an order of illustrated steps may be changed within an extent that there is no harm in context. Further, each of the example embodiments described above can be combined within an extent that a content is not inconsistent.

A part or the whole of the above-described example embodiment may also be described in supplementary notes below, which is not limited thereto.

1-1. A wind estimation apparatus including:
    an acquisition unit that acquires a target image of a target region; and
    an estimation unit that estimates at least one of a direction and strength of wind in the target region by using the target image.

1-2. The wind estimation apparatus according to supplementary note 1-1., wherein the acquisition unit acquires the target image from a camera mounted on a moving body.

1-3. The wind estimation apparatus according to supplementary note 1-2., wherein
    the moving body is a flying object,
    the wind estimation apparatus further including a control unit that controls flying of the moving body, wherein the control unit controls flying of the moving body, based on at least one of the direction and the strength of wind estimated by the estimation unit.

1-4. The wind estimation apparatus according to supplementary note 1-2., further including a control unit that controls a sound acquisition unit that acquires a sound around the moving body, wherein the control unit controls the sound acquisition unit, based on at least one of the direction and the strength of wind estimated by the estimation unit.

1-5. The wind estimation apparatus according to any one of supplementary notes 1-1. to 1-4., wherein the estimation unit determines a trajectory of a floating matter in a plurality of the target images in time series, and estimates at least one of a direction and strength of wind, based on the determined trajectory.

1-6. The wind estimation apparatus according to supplementary note 1-5., wherein the acquisition unit acquires, as the target image, an image of the target region in a state where light is irradiated from an irradiation unit.

1-7. The wind estimation apparatus according to supplementary note 1-5. or 1-6., wherein the acquisition unit acquires the target image from a camera mounted on a moving body, and the estimation unit estimates at least one of the direction and the strength of wind by further using reference information about a trajectory of a floating matter, the reference information being prepared for each movement pattern of the moving body.

1-8. The wind estimation apparatus according to supplementary note 1-7., wherein the reference information is information indicating a first reference trajectory being acquired by removing a trajectory that satisfies a predetermined condition from trajectories of a plurality of floating matters determined in a first image captured in a state where strength of wind is equal to or less than predetermined strength.

1-9. The wind estimation apparatus according to supplementary note 1-8., wherein the predetermined condition is a condition generated by using a second image captured by a camera in a state where a focal distance is shorter than that of the first image.

1-10. The wind estimation apparatus according to supplementary note 1-9., wherein the first image is an image captured by a camera in a state where a focal distance is equal to or more than 20 m and equal to or less than 40 m, and the second image is an image captured by a camera in a state where a focal distance is equal to or more than 1 m and equal to or less than 10 m.

1-11. The wind estimation apparatus according to any one of supplementary notes 1-8. to 1-10., wherein the estimation unit generates information indicating a first target trajectory being acquired by removing a trajectory that satisfies the predetermined condition from trajectories of the floating matters determined in a plurality of the target images in the time series, and estimates at least one of a direction and strength of wind, based on a difference between the first target trajectory and the first reference trajectory.

2-1. A wind estimation system including:

the wind estimation apparatus according to any one of supplementary notes 1-2. to 1-4.;

the camera; and an irradiation unit that irradiates light to the target region.

2-2. The wind estimation system according to supplementary note 2-1., wherein the estimation unit determines a trajectory of a floating matter in a plurality of the target images in time series, and estimates at least one of a direction and strength of wind, based on the determined trajectory.

2-3. The wind estimation system according to supplementary note 2-2., wherein the acquisition unit acquires, as the target image, an image of the target region in a state where light is irradiated from the irradiation unit.

2-4. The wind estimation system according to supplementary note 2-2. or 2-3., wherein the estimation unit estimates at least one of the direction and the strength of wind by further using reference information about a trajectory of a floating matter, the reference information being prepared for each movement pattern of the moving body.

2-5. The wind estimation system according to supplementary note 2-4., wherein the reference information is information indicating a first reference trajectory being acquired by removing a trajectory that satisfies a predetermined condition from trajectories of a plurality of floating matters determined in a first image captured in a state where strength of wind is equal to or less than predetermined strength.

2-6. The wind estimation system according to supplementary note 2-5., wherein the predetermined condition is a condition generated by using a second image captured by a camera in a state where a focal distance is shorter than that of the first image.

2-7. The wind estimation system according to supplementary note 2-6., wherein the first image is an image captured by a camera in a state where a focal distance is equal to or more than 20 m and equal to or less than 40 m, and the second image is an image captured by a camera in a state where a focal distance is equal to or more than 1 m and equal to or less than 10 m.

2-8. The wind estimation system according to any one of supplementary notes 2-5. to 2-7., wherein the estimation unit generates information indicating a first target trajectory being acquired by removing a trajectory that satisfies the predetermined condition from trajectories of the floating matters determined in a plurality of the target images in the time series, and estimates at least one of a direction and strength of wind, based on a difference between the first target trajectory and the first reference trajectory.

3-1. A wind estimation method including, by one or more computers:

acquiring a target image of a target region; and estimating at least one of a direction and strength of wind in the target region by using the target image.

3-2. The wind estimation method according to supplementary note 3-1., including,
by the one or more computers,
acquiring the target image from a camera mounted on a moving body.

3-3. The wind estimation method according to supplementary note 3-2., wherein
the moving body is a flying object,
the wind estimation method further including,
by the one or more computers,
controlling flying of the moving body, based on at least one of the estimated direction and the estimated strength of the wind.

3-4. The wind estimation method according to supplementary note 3-2., further including,
by the one or more computers,
controlling a sound acquisition unit that acquires a sound around the moving body, based on at least one of the estimated direction and the estimated strength of the wind.

3-5. The wind estimation method according to any one of supplementary notes 3-1. to 3-4., including,
by the one or more computers:
determining a trajectory of a floating matter in a plurality of the target images in time series; and
estimating at least one of the direction and the strength of wind, based on the determined trajectory.

3-6. The wind estimation method according to supplementary note 3-5., further including,
by the one or more computers,
acquiring, as the target image, an image of the target region in a state where light is irradiated from an irradiation unit.

3-7. The wind estimation method according to supplementary note 3-5. or 3-6., including,
by the one or more computers:
acquiring the target image from a camera mounted on a moving body; and
estimating at least one of the direction and the strength of wind by further using reference information about a trajectory of a floating matter, the reference information being prepared for each movement pattern of the moving body.

3-8. The wind estimation method according to supplementary note 3-7., wherein
the reference information is information indicating a first reference trajectory being acquired by removing a trajectory that satisfies a predetermined condition from trajectories of a plurality of floating matters determined in a first image captured in a state where strength of wind is equal to or less than predetermined strength.

3-9. The wind estimation method according to supplementary note 3-8., wherein
the predetermined condition is a condition generated by using a second image captured by a camera in a state where a focal distance is shorter than that of the first image.

3-10. The wind estimation method according to supplementary note 3-9., wherein
the first image is an image captured by a camera in a state where a focal distance is equal to or more than 20 m and equal to or less than 40 m, and the second image is an image captured by a camera in a state where a focal distance is equal to or more than 1 m and equal to or less than 10 m.

3-11. The wind estimation method according to any one of supplementary notes 3-8. to 3-10., including,
by the one or more computers:
generating information indicating a first target trajectory being acquired by removing a trajectory that satisfies the predetermined condition from trajectories of the floating matters determined in a plurality of the target images in the time series; and
estimating at least one of the direction and the strength of wind, based on a difference between the first target trajectory and the first reference trajectory.

4-1. A program causing a computer to function as a wind estimation apparatus, wherein
the wind estimation apparatus includes
an acquisition unit that acquires a target image of a target region, and
an estimation unit that estimates at least one of a direction and strength of wind in the target region by using the target image.

4-2. The program according to supplementary note 4-1., wherein
the acquisition unit acquires the target image from a camera mounted on a moving body.

4-3. The program according to supplementary note 4-2., wherein
the moving body is a flying object,
the wind estimation apparatus further includes a control unit that controls flying of the moving body, and
the control unit controls flying of the moving body, based on at least one of a the direction and the strength of wind estimated by the estimation unit.

4-4. The program according to supplementary note 4-2., wherein
the wind estimation apparatus further includes a control unit that controls a sound acquisition unit that acquires a sound around the moving body, and
the control unit controls the sound acquisition unit, based on at least one of the direction and the strength of the wind estimated by the estimation unit.

4-5. The program according to any one of supplementary notes 4-1. to 4-4., wherein
the estimation unit
determines a trajectory of a floating matter in a plurality of the target images in time series, and
estimates at least one of the direction and the strength of the wind, based on the determined trajectory.

4-6. The program according to supplementary note 4-5., wherein
the acquisition unit acquires, as the target image, an image of the target region in a state where light is irradiated from an irradiation unit.

4-7. The program according to supplementary note 4-5. or 4-6., wherein
the acquisition unit acquires the target image from a camera mounted on a moving body, and
the estimation unit estimates at least one of the direction and the strength of the wind by further using reference information about a trajectory of a floating matter, the reference information being prepared for each movement pattern of the moving body.

4-8. The program according to supplementary note 4-7., wherein the reference information is information indicating a first reference trajectory being acquired by removing a trajectory that satisfies a predetermined condition from trajectories of a plurality of floating matters determined in a first image captured in a state where strength of wind is equal to or less than predetermined strength.

4-9. The program according to supplementary note 4-8., wherein the predetermined condition is a condition generated by using a second image captured by a camera in a state where a focal distance is shorter than that of the first image.

4-10. The program according to supplementary note 4-9., wherein the first image is an image captured by a camera in a state where a focal distance is equal to or more than 20 m and equal to or less than 40 m, and the second image is an image captured by a camera in a state where a focal distance is equal to or more than 1 m and equal to or less than 10 m.

4-11. The program according to any one of supplementary notes 4-8. to 4-10., wherein the estimation unit generates information indicating a first target trajectory being acquired by removing a trajectory that satisfies the predetermined condition from trajectories of the floating matters determined in a plurality of the target images in the time series, and estimates at least one of the direction and the strength of the wind, based on a difference between the first target trajectory and the first reference trajectory.

5-1. A computer-readable storage medium that stores a program, wherein the program causes a computer to function as a wind estimation apparatus, and the wind estimation apparatus includes an acquisition unit that acquires a target image of a target region, and an estimation unit that estimates at least one of a direction and strength of wind in the target region by using the target image.

5-2. The storage medium according to supplementary note 5-1., wherein the acquisition unit acquires the target image from a camera mounted on a moving body.

5-3. The storage medium according to supplementary note 5-2., wherein the moving body is a flying object, the wind estimation apparatus further includes a control unit that controls flying of the moving body, and the control unit controls flying of the moving body, based on at least one of the direction and the strength of the wind estimated by the estimation unit 5-4. The storage medium according to supplementary note 5-2., wherein the wind estimation apparatus further includes a control unit that controls a sound acquisition unit that acquires a sound around the moving body, and the control unit controls the sound acquisition unit, based on at least one of the direction and the strength of the wind estimated by the estimation unit.

5-5. The storage medium according to any one of supplementary notes 5-1. to 5-4., wherein the estimation unit determines a trajectory of a floating matter in a plurality of the target images in time series, and estimates at least one of the direction and the strength of the wind, based on the determined trajectory.

5-6. The storage medium according to supplementary note 5-5., wherein the acquisition unit acquires, as the target image, an image of the target region in a state where light is irradiated from an irradiation unit.

5-7. The storage medium according to supplementary note 5-5. or 5-6., wherein the acquisition unit acquires the target image from a camera mounted on a moving body, and the estimation unit estimates at least one of the direction and the strength of the wind by further using reference information about a trajectory of a floating matter, the reference information being prepared for each movement pattern of the moving body.

5-8. The storage medium according to supplementary note 5-7., wherein the reference information is information indicating a first reference trajectory being acquired by removing a trajectory that satisfies a predetermined condition from trajectories of a plurality of floating matters determined in a first image captured in a state where strength of wind is equal to or less than predetermined strength.

5-9. The storage medium according to supplementary note 5-8., wherein the predetermined condition is a condition generated by using a second image captured by a camera in a state where a focal distance is shorter than that of the first image.

5-10. The storage medium according to supplementary note 5-9., wherein the first image is an image captured by a camera in a state where a focal distance is equal to or more than 20 m and equal to or less than 40 m, and the second image is an image captured by a camera in a state where a focal distance is equal to or more than 1 m and equal to or less than 10 m.

5-11. The storage medium according to any one of supplementary notes 5-8. to 5-10., wherein the estimation unit generates information indicating a first target trajectory being acquired by removing a trajectory that satisfies the predetermined condition from trajectories of the floating matters determined in a plurality of the target images in the time series, and estimates at least one of the direction and the strength of the wind, based on a difference between the first target trajectory and the first reference trajectory.

The invention claimed is:

1. A wind estimation apparatus comprising:

at least one memory configured to store instructions; and at least one processor configured to execute the instructions to perform operations comprising:

acquiring a target image of a target region; and estimating at least one of a direction and strength of wind in the target region by using the target image, wherein:

the acquiring the target image comprises acquiring the target image from a camera mounted on a moving body, and the operations further comprise controlling a microphone based on an estimated result obtained by estimating at least one of the direction and the strength of wind in the target region by using the target image, the microphone acquiring a sound around the moving body.

2. The wind estimation apparatus according to claim 1, wherein:
the moving body is a flying object, and
the operations further comprise controlling flying of the moving body based on at least one of the estimated direction and the estimated strength of wind.

3. The wind estimation apparatus according to claim 1, wherein the estimating at least one of the direction and the strength of the wind comprises:
determining a trajectory of a floating matter in a plurality of the target images in time series; and
estimating at least one of the direction and the strength of the wind, based on the determined trajectory.

4. The wind estimation apparatus according to claim 3, wherein the acquiring the target image comprises acquiring, as the target image, an image of the target region in a state where light is irradiated from a lighting device.

5. The wind estimation apparatus according to claim 3, wherein the estimating at least one of the direction and the strength of the wind comprises estimating at least one of the direction and the strength of the wind by further using reference information about a trajectory of a floating matter, the reference information being prepared for each movement pattern of the moving body.

6. A wind estimation method comprising, by one or more computers:
acquiring a target image of a target region; and
estimating at least one of a direction and strength of wind in the target region by using the target image, wherein:
the acquiring the target image comprises acquiring the target image from a camera mounted on a moving body, and
the wind estimation method further comprises controlling a microphone based on an estimated result obtained by estimating at least one of the direction and the strength of wind in the target region by using the target image, the microphone acquiring a sound around the moving body.

7. The wind estimation method according to claim 6, wherein:
the moving body is a flying object, and
the wind estimation method further comprises, by the one or more computers, controlling flying of the moving body based on at least one of the estimated direction and the estimated strength of the wind.

8. The wind estimation method according to claim 6, wherein the estimating at least one of the direction and the strength of the wind comprises:
determining a trajectory of a floating matter in a plurality of the target images in time series; and estimating at least one of the direction and the strength of the wind, based on the determined trajectory.

9. The wind estimation method according to claim 8, wherein the acquiring the target image comprises acquiring, as the target image, an image of the target region in a state where light is irradiated from a lighting device.

10. A non-transitory storage medium storing a program causing a computer to execute a wind estimation method, the wind estimation method comprising:
acquiring a target image of a target region; and
estimating at least one of a direction and strength of wind in the target region by using the target image, wherein:
the acquiring the target image comprises acquiring the target image from a camera mounted on a moving body, and
the operations further comprise controlling a microphone based on an estimated result obtained by estimating at least one of the direction and the strength of wind in the target region by using the target image, the microphone acquiring a sound around the moving body.

11. The non-transitory storage medium according to claim 10, wherein:
the moving body is a flying object, and
the wind estimation method further comprises controlling flying of the moving body based on at least one of the estimated direction and the estimated strength of the wind.

12. The non-transitory storage medium according to claim 10, wherein the estimating at least one of the direction and the strength of the wind comprises:
determining a trajectory of a floating matter in a plurality of the target images in time series; and
estimating at least one of the direction and the strength of the wind, based on the determined trajectory.

13. The non-transitory storage medium according to claim 12, wherein the acquiring the target image comprises acquiring, as the target image, an image of the target region in a state where light is irradiated from a lighting device.

14. The wind estimation apparatus according to claim 1, wherein the controlling the microphone based on the estimated result comprises controlling, based on the estimated result, at least one of noise canceling and directivity of the microphone.

15. The wind estimation method according to claim 6, wherein the controlling the microphone based on the estimated result comprises controlling, based on the estimated result, at least one of noise canceling and directivity of the microphone.

16. The non-transitory storage medium according to claim 10, wherein the controlling the microphone based on the estimated result comprises controlling, based on the estimated result, at least one of noise canceling and directivity of the microphone.

* * * * *